(12) United States Patent
Mitsuta et al.

(10) Patent No.: US 8,982,212 B2
(45) Date of Patent: Mar. 17, 2015

(54) SURROUNDING AREA MONITORING DEVICE FOR WORK VEHICLE

(75) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/819,137

(22) PCT Filed: May 23, 2012

(86) PCT No.: PCT/JP2012/063136
§ 371 (c)(1),
(2), (4) Date: Feb. 26, 2013

(87) PCT Pub. No.: WO2012/169353
PCT Pub. Date: Dec. 13, 2012

(65) Prior Publication Data
US 2013/0162830 A1    Jun. 27, 2013

(30) Foreign Application Priority Data
Jun. 7, 2011    (JP) .................................. 2011-127307

(51) Int. Cl.
*H04N 7/18*    (2006.01)
*B60R 1/00*    (2006.01)
*E02F 9/26*    (2006.01)

(52) U.S. Cl.
CPC .. *B60R 1/00* (2013.01); *H04N 7/18* (2013.01); *B60R 2300/105* (2013.01); *B60R 2300/303* (2013.01); *B60R 2300/602* (2013.01); *B60R 2300/607* (2013.01); *E02F 9/261* (2013.01)
USPC ........................................................ 348/148

(58) Field of Classification Search
None
See application file for complete search history.

(56) References Cited

U.S. PATENT DOCUMENTS

2006/0132601 A1 *   6/2006   Kukita et al. ................. 348/148
2008/0181591 A1 *   7/2008   Hongo ............................ 396/50

(Continued)

FOREIGN PATENT DOCUMENTS

JP    2002-135765 A    5/2002
JP    2004-021307 A    1/2004

(Continued)

OTHER PUBLICATIONS

International Search Report for PCT/JP2012/063136.

*Primary Examiner* — Christopher S Kelley
*Assistant Examiner* — Kaitlin A Retallick
(74) *Attorney, Agent, or Firm* — Global IP Counselors, LLP

(57) ABSTRACT

A work vehicle surrounding area monitoring device includes an imaging unit, a bird's-eye view image creating unit, a display unit and a traveling state determining unit. When the work vehicle is in the stopped state, the bird's-eye view image creating unit is configured to use a first virtual projection plane to create the bird's-eye view image, and at least an outer edge portion of the first virtual projection plane has a shape that increases in height from the ground surface as a distance from the work vehicle increases. When the work vehicle is in the traveling state, the bird's-eye view image creating unit is configured to use a second virtual projection plane to create the bird's-eye view image, and at least an outer edge portion of the second virtual projection plane has a shape having a uniformly flat height from the ground surface.

6 Claims, 12 Drawing Sheets

(56) References Cited

U.S. PATENT DOCUMENTS

| | | | |
|---|---|---|---|
| 2009/0079828 A1* | 3/2009 | Lee et al. .................. | 348/148 |
| 2009/0259400 A1* | 10/2009 | Coats et al. .................. | 701/301 |
| 2011/0001826 A1* | 1/2011 | Hongo .................. | 348/148 |
| 2011/0157361 A1* | 6/2011 | Wu et al. .................. | 348/148 |

FOREIGN PATENT DOCUMENTS

| | | |
|---|---|---|
| JP | 2010-204821 A | 9/2010 |
| WO | 2010/137265 A1 | 12/2010 |

\* cited by examiner

SURROUNDING AREA MONITORING DEVICE FOR WORK VEHICLE

CROSS-REFERENCE TO RELATED APPLICATIONS

This application claims priority to Japanese Patent Application No. 2011-127307 filed on Jun. 7, 2011, the disclosure of which is hereby incorporated herein by reference in its entirety.

TECHNICAL FIELD

The present invention relates to a surrounding area monitoring device for a work vehicle.

BACKGROUND ART

Conventionally, trucks as large scale work vehicles are widely used for carrying crushed stone at mines and the like. Since these types of dump trucks are markedly wider and longer from front to back than typical vehicles, the driver finds it difficult to discern the conditions in the area surrounding the work vehicle using the side mirrors and the like.

On the one hand, a surrounding area monitoring device has been proposed for allowing a driver to easily understand the conditions surrounding the vehicle. The surrounding area monitoring device includes an imaging unit such as a camera mounted on the vehicle. The surrounding area monitoring device creates a bird's-eye view image showing the area surrounding the work vehicle by synthesizing images taken by the imaging unit. For example, in the surrounding area monitoring device for an automobile disclosed in Japanese Patent Laid-Open No. 2004-21307, a bird's-eye view image is created by projecting an image taken by the imaging unit onto a virtual projection plane. Generally, objects that are far away from the vehicle are displayed in an enlarged manner in the bird's-eye view image when the virtual projection plane has a flat shape. As a result, the image is displayed in a wide manner in the traveling direction of the vehicle in the above bird's-eye view image. Accordingly, the virtual projection plane in the surrounding area monitoring device of the above mentioned publication has a shape that gradually rises in the traveling direction of the vehicle. As a result, the image being displayed in a wide manner in the traveling direction of the vehicle can be suppressed.

SUMMARY

However, when the virtual projection plane is a shape that gradually rises in the traveling direction of the vehicle as described above, an object appears distorted at the outer edge portion of the bird's-eye view image. Therefore, the road around the vehicle also appears distorted in the bird's-eye view image. As a result, when the vehicle is traveling, there is a problem in that the operator has difficulty in recognizing the location of the vehicle traveling on the road. This type of problem is especially noticeable in a work vehicle such as an extra-large dump truck and the like since there are a multitude of regions that the operator cannot observe directly in the surrounding area of the work vehicle.

An object of the present invention is to provide a surrounding area monitoring device for a work vehicle, the device capable of allowing an operator to easily recognize a location of the work vehicle while the work vehicle is traveling.

A work vehicle surrounding area monitoring device according to a first aspect of the present invention includes an imaging unit, a bird's-eye view image creating unit, a display unit, and a traveling state determining unit. The imaging unit is mounted on a work vehicle and images a region of a surrounding area of the work vehicle to obtain image data. The bird's-eye view image creating unit creates a bird's-eye view image of the surrounding area of the work vehicle by projecting the image data on a virtual projection plane. The display unit displays the bird's-eye view image. The traveling state determining unit determines whether the work vehicle is in a traveling state or a stopped state. When the work vehicle is in the stopped state, the bird's-eye view image creating unit creates the bird's-eye view image using a first virtual projection plane. At least an outer edge portion of the first virtual projection plane is a shape that increases in height from the ground surface as the distance from the work vehicle increases. When the work vehicle is in the traveling state, the bird's-eye view image creating unit creates the bird's-eye view image using a second virtual projection plane. At least an outer edge portion of the second virtual projection plane is a shape that has a uniformly flat height from the ground surface.

A work vehicle surrounding area monitoring device according to a second aspect of the present invention is related to the work vehicle surrounding area monitoring device according to the first aspect, wherein the virtual projection planes include a first range and a second range. The first range is located in the surrounding area of the work vehicle. The second range is further away from the work vehicle than the first range. The first range of the first virtual projection plane is a shape having a height from the ground surface that is uniformly flat. The second range of the first virtual projection plane is a shape that increases in height from the ground surface as the distance from the work vehicle increases. The first range and the second range of the second virtual projection plane have shapes that have a height from the ground surface that is uniformly flat.

A work vehicle surrounding area monitoring device according to a third aspect of the present invention is related to the work vehicle surrounding area monitoring device according to the second aspect, wherein the second range of the first virtual projection plane includes a plurality of curved surfaces and a plurality of spherical surfaces. The plurality of curved surfaces is curved around virtual axes that are parallel to rectangular sides corresponding to the contour of the work vehicle. The plurality of spherical surfaces is respectively disposed between an adjacent pair of curved surfaces and is continuously joined to the pair of curved surfaces.

A work vehicle surrounding area monitoring device according to a fourth aspect of the present invention is related to the work vehicle surrounding area monitoring device according to the first aspect, wherein the entire second virtual projection plane is a shape having a height from the ground surface that is uniformly flat.

A work vehicle surrounding area monitoring device according to a fifth aspect of the present invention is related to the work vehicle surrounding area monitoring device according to the first aspect, and further includes a vehicle speed detecting unit. The vehicle speed detecting unit detects a vehicle speed of the work vehicle. The traveling state determining unit determines that the work vehicle is in the traveling state when the vehicle speed is equal to or greater than a predetermined threshold. The traveling state determining unit determines that the work vehicle is in the stopped state when the vehicle speed is less than the predetermined threshold.

A work vehicle according to a sixth aspect of the present invention includes the surrounding area monitoring device described in any one of the first to fifth aspects.

When the work vehicle is in the stopped state, the bird's-eye view image creating unit creates the bird's-eye view image using the first virtual projection plane in the work vehicle surrounding area monitoring device according to the first aspect of the present invention. At least the outer edge portion of the first virtual projection plane is a shape that increases in height from the ground surface as the distance from the work vehicle increases. Therefore, the phenomenon of the object appearing in an enlarged manner in the bird's-eye view image as the object is located further away from the work vehicle can be suppressed. As a result, the operator easily recognizes the shape of the object based on the bird's-eye view image. Further, when the work vehicle is in the traveling state, the bird's-eye view image creating unit creates the bird's-eye view image using the second virtual projection plane. At least the outer edge portion of the second virtual projection plane is a shape that has a uniformly flat height from the ground surface. As a result, distortion of the ground surface at the outer edge portion of the bird's-eye view image is suppressed. Therefore, the distorted appearance of the road in the surrounding area of the work vehicle in the bird's-eye view image is suppressed. Consequently, the operator can easily recognize a location of the work vehicle while the work vehicle is traveling.

In the work vehicle surrounding area monitoring device according to the second aspect of the present invention, the first range of the first virtual projection plane is a shape having a height from the ground surface that is uniformly flat. The second range of the first virtual projection plane is a shape that increases in height from the ground surface as the distance from the work vehicle increases. As a result, a natural bird's-eye view image can be created that appears to be imaging the ground surface from above the work vehicle in the first range that is nearer the work vehicle than the second range. Moreover, the phenomenon of an object that is located further away from the work vehicle appearing in an enlarged manner in the bird's-eye view image in the second range that is further away from the work vehicle than the first range can be suppressed. As a result, the operator easily understands the shape of the object due to the bird's-eye view image when the work vehicle is in the stopped state. Moreover, the first range and the second range of the second virtual projection plane have a shape having a height from the ground surface that is uniformly flat. As a result, distortion of the ground surface at the outer edge portion of the bird's-eye view image is suppressed when the work vehicle is in the traveling state. Consequently, the operator can easily recognize the location of the work vehicle while the work vehicle is traveling.

In a work vehicle surrounding area monitoring device according to the third aspect of the present invention, the plurality of curved surfaces and the plurality of spherical surfaces are continuously joined in the first virtual projection plane. As a result, a smooth bird's-eye view image with little discomfort for the operator can be created.

In a work vehicle surrounding area monitoring device according to the fourth aspect of the present invention, the entire second virtual projection plane is a shape having a height from the ground surface that is uniformly flat. As a result, distortion of the ground surface at the outer edge portion of the bird's-eye view image is suppressed. Consequently, the operator can easily recognize the location of the work vehicle while the work vehicle is traveling.

In the work vehicle surrounding area monitoring device according to the fifth aspect of the present invention, the traveling state determining unit determines that the work vehicle is in the stopped state when the vehicle speed is less than the predetermined threshold. As a result, the work vehicle is determined to be in the stopped state even if the work vehicle is traveling at a reduced speed. Consequently, the operator can easily understand the size and shape of an object due to the bird's-eye view image when the work vehicle is traveling at a reduced speed.

When the work vehicle is in the stopped state, the bird's-eye view image creating unit creates the bird's-eye view image using the first virtual projection plane in the work vehicle according to the seventh aspect of the present invention. At least an outer edge portion of the first virtual projection plane is a shape that increases in height from the ground surface as the distance from the work vehicle increases. Therefore, the phenomenon of the object appearing in an enlarged manner in the bird's-eye view image as the object is located further away from the work vehicle can be suppressed. As a result, the operator easily recognizes the shape of the object based on the bird's-eye view image. When the work vehicle is in the traveling state, the bird's-eye view image creating unit creates a bird's-eye view image using the second virtual projection plane. At least the outer edge portion of the second virtual projection plane is a shape that has a uniformly flat height from the ground surface. As a result, distortion of the ground surface at the outer edge portion of the bird's-eye view image is suppressed. Therefore, the distorted appearance of the road in the surrounding area of the work vehicle in the bird's-eye view image is suppressed. Consequently, the operator can easily recognize the location of the work vehicle while the work vehicle is traveling.

DESCRIPTION OF EMBODIMENTS

Hereinbelow, embodiments of the present invention will be described with reference to the accompanying drawings. In the following description, "front," "back," "left," and "right" are terms used on the basis of a driver sitting in the driver's seat. Further, "vehicle width direction" and "left and right direction" have the same meaning.

Figure 1:
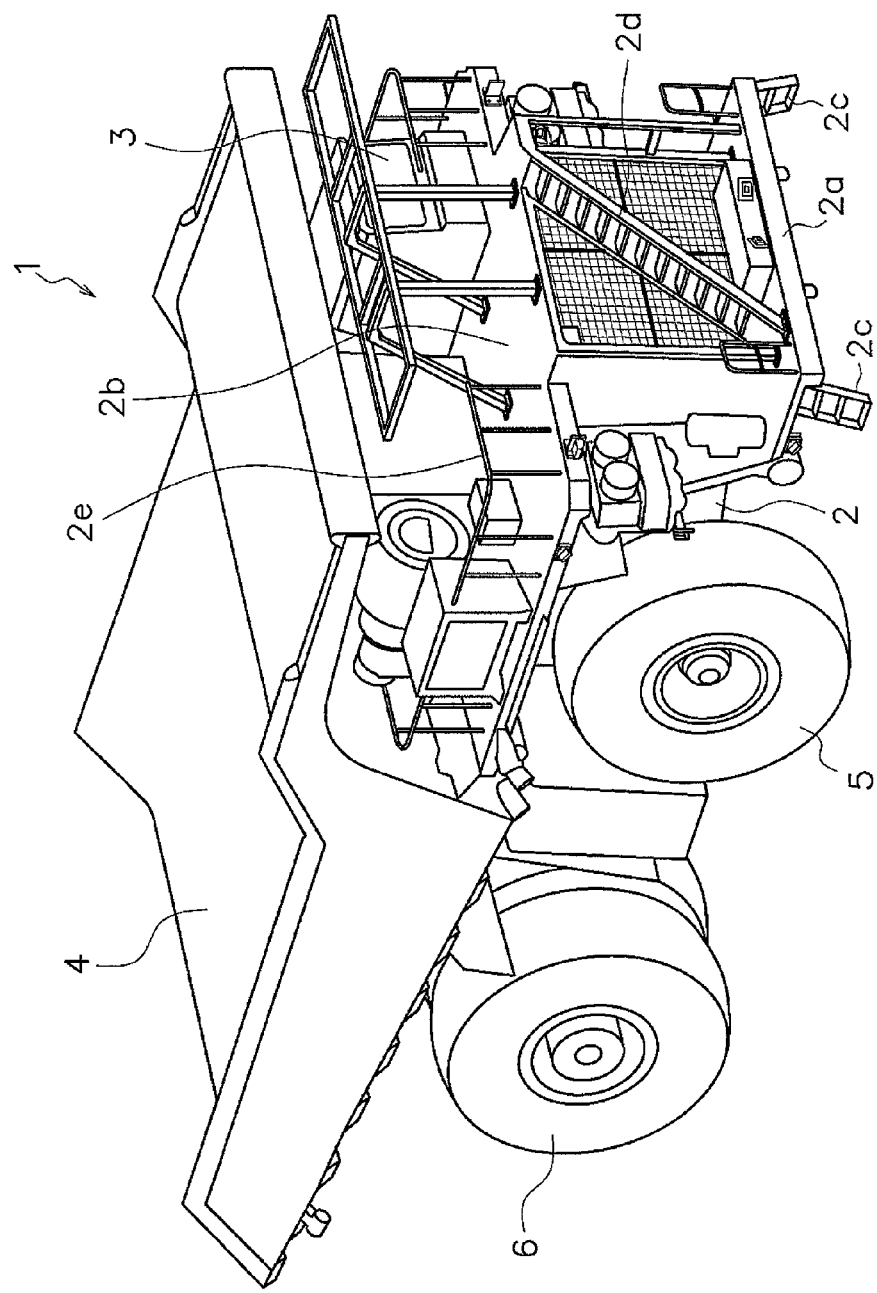
FIG. 1 is a perspective view of an overall configuration of a work vehicle according to an embodiment of the present invention.

FIG. 1 is a perspective view of a work vehicle 1 according to an embodiment of the present invention. The work vehicle 1 is a self-propelled extra-large dump truck used in mining operations or the like.

The work vehicle 1 mainly includes a vehicle frame 2, a cab 3, a vessel 4, front wheels 5, and rear wheels 6. The work vehicle 1 includes a surrounding area monitoring device 10 (see FIG. 2) that monitors a surrounding area of the work vehicle 1 and displays the result. Details of the surrounding area monitoring device 10 are described below.

The vehicle frame 2 supports power mechanisms such as a diesel engine and a transmission (not shown) and other peripheral equipment. The front portion of the vehicle frame 2 is supported by left and right front wheels 5 (only the right front wheel is shown in FIG. 1). The back portion of the vehicle frame 2 is supported by left and right rear wheels 6 (only the right rear wheel is shown in FIG. 1). The vehicle frame 2 has a lower deck 2a and an upper deck 2b. The lower deck 2a is attached to a bottom portion at the front surface of the vehicle frame 2. The upper deck 2b is disposed above the lower deck 2a. A movable ladder 2c, for example, is provided between the lower deck 2a and the ground surface. A diagonal ladder 2d is disposed between the lower deck 2a and the upper deck 2b. A palisaded handrail 2e is provided on the upper deck 2b.

The cab 3 is provided on the upper deck 2b. The cab 3 is located toward one side in the vehicle width direction from the center of the vehicle width direction on the upper deck 2b. Specifically, the cab 3 is located on the left side from the center of the vehicle width direction on the upper deck 2b. A driver seat and operating members (not shown) such as a steering wheel, a shift lever, an accelerator pedal, and a braking pedal and the like are provided inside the cab 3.

The vessel 4 is a container for loading heavy objects such as crushed rock. The rear portion of the bottom of the vessel 4 is pivotably connected to the rear portion of the vehicle frame 2 via a pivot pin (not shown). The vessel 4 is able to assume a loading orientation and an erect orientation due to an actuator such as a hydraulic cylinder (not shown). The loading orientation is one in which the front of the vessel 4 is located above the cab 3 as shown in FIG. 1. The erect orientation is one for discharging loaded objects in a state in which the vessel 4 is inclined in a direction rearward and downward. By pivoting the front portion of the vessel upward, the vessel 4 changes from the loading orientation to the erect orientation.

Figure 2:
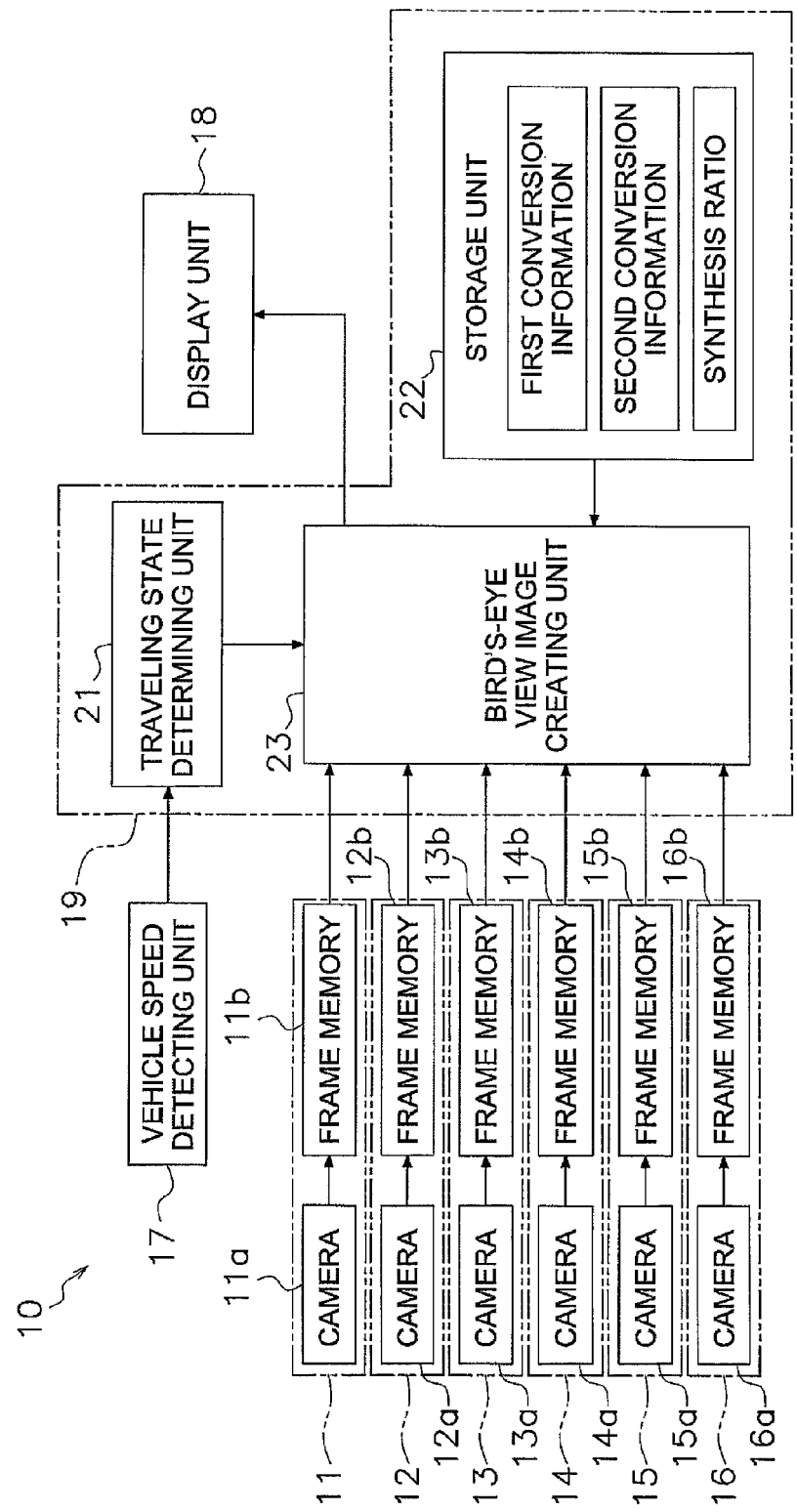
FIG. 2 is a block diagram illustrating a configuration of a surrounding area monitoring device according to an embodiment of the present invention.

FIG. 2 is a block diagram illustrating a configuration of surrounding area monitoring device 10 provided in the work vehicle 1. The surrounding area monitoring device 10 has a plurality of imaging units 11 to 16, a vehicle speed detecting unit 17, a display unit 18, and a controller 19.

Figure 3:
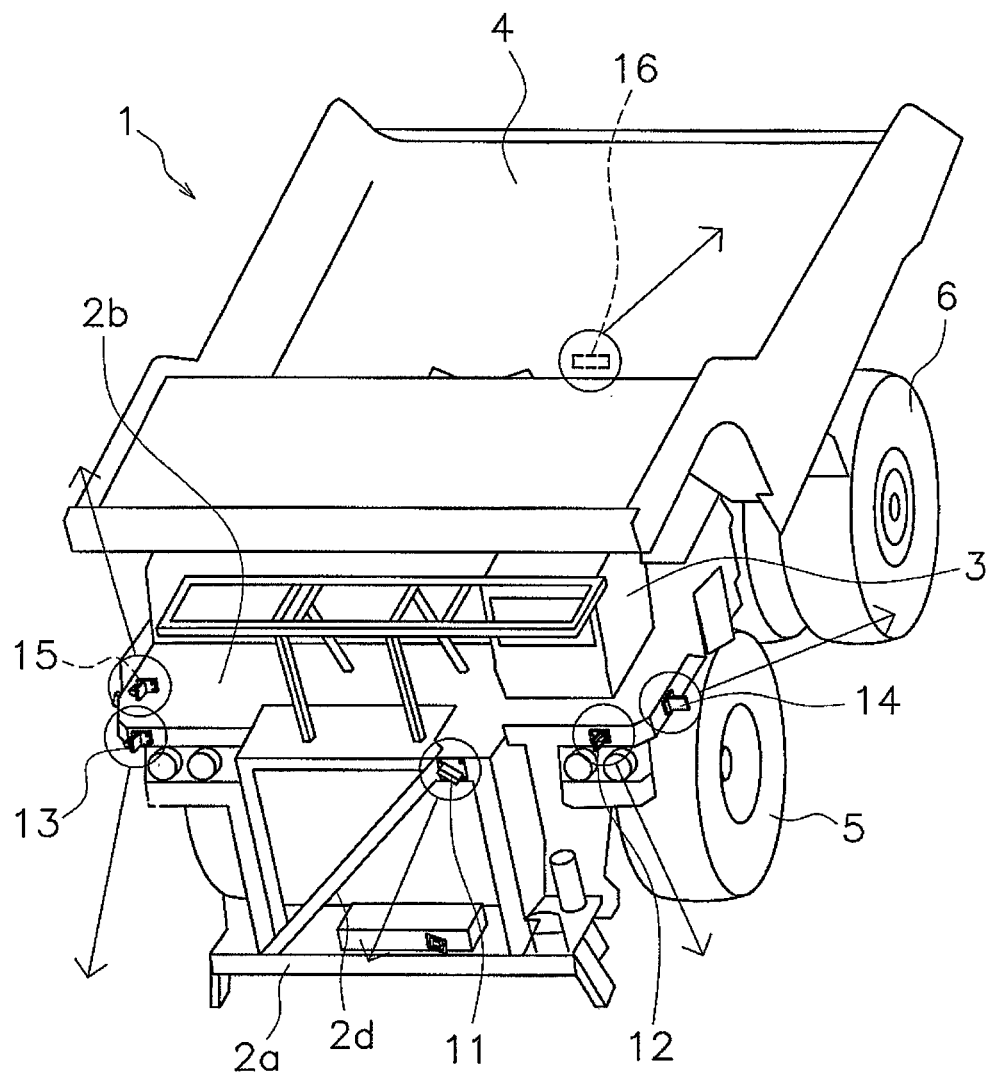
FIG. 3 is a perspective view of the work vehicle illustrating mounting positions of a plurality of imaging units of the surrounding area monitoring device.
Figure 4:
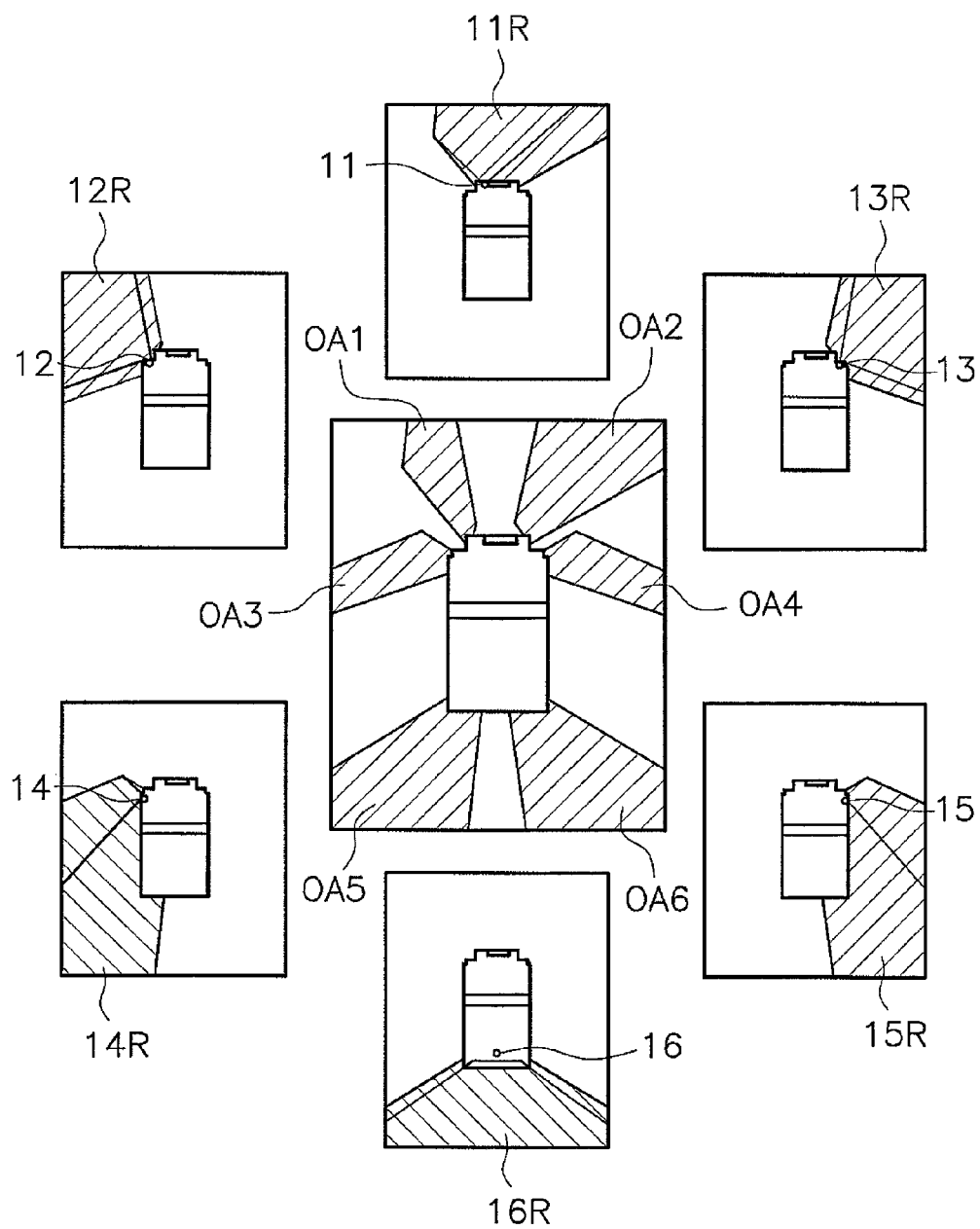
FIG. 4 is a top view illustrating imaging ranges and the mounting positions of the plurality of imaging units of the surrounding area monitoring device.
Figure 5:
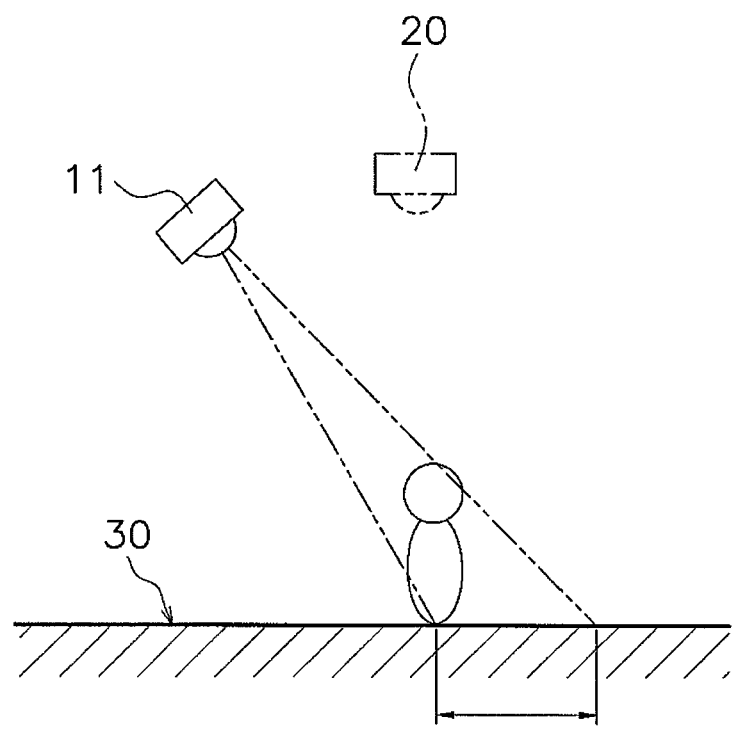
FIG. 5 illustrates an image conversion method using a virtual projection plane.

The imaging units 11 to 16 are mounted on the work vehicle 1. The imaging units 11 to 16 image the surrounding area of the work vehicle 1 to obtain image data. The imaging units 11 to 16 respectively have cameras 11a to 16a and frame memories 11b to 16b. The frame memories 11b to 16b temporarily save the image data imaged by the cameras 11a to 16a. The plurality of imaging units 11 to 16 have first to sixth imaging units 11 to 16. FIG. 3 is a work vehicle 1 perspective view showing mounting locations of the first to sixth imaging units 11 to 16. FIG. 4 is a work vehicle 1 top view showing mounting locations and imaging ranges of the first to sixth imaging units 11 to 16.

As illustrated in FIG. 3, the first imaging unit 11 is attached to the front surface of the work vehicle 1. Specifically, the first imaging unit 11 is disposed on a top portion of the diagonal ladder 2d. As illustrated in FIG. 4, the first imaging unit 11 images a first region 11R of the surrounding area of the work vehicle 1 to obtain first image data. The first region 11R is located at the front of the work vehicle 1.

As illustrated in FIG. 3, the second imaging unit 12 is attached one side on the front surface of the work vehicle 1. Specifically, the second imaging unit 12 is disposed on a left side portion on the front surface of the upper deck 2b. As illustrated in FIG. 4, the second imaging unit 12 images a second region 12R to obtain second image data. The second region 12R is located diagonally forward left of the work vehicle 1. As illustrated in FIG. 3, the third imaging unit 13 is attached to the other side on the front surface of the work vehicle 1. Specifically, the third imaging unit 13 is mounted in a location having left-right symmetry with the second imaging unit 12. Specifically, the third imaging unit 13 is disposed on a right side portion on the front surface of the upper deck 2b. As illustrated in FIG. 4, the third imaging unit 13 images a third region 13R of the surrounding area of the work vehicle 1 to obtain third image data. The third region 13R is located diagonally forward right of the work vehicle 1.

As illustrated in FIG. 3, the fourth imaging unit 14 is attached one side surface of the work vehicle 1. Specifically, the fourth imaging unit 14 is disposed on a front portion of a left side surface of the upper deck 2b. As illustrated in FIG. 4, the fourth imaging unit 14 images a fourth region 14R of the surrounding area of the work vehicle 1 to obtain fourth image data. The fourth region 14R is located diagonally rearward left of the work vehicle 1. As illustrated in FIG. 3, the fifth imaging unit 15 is attached the other side surface of the work vehicle 1. Specifically, the fifth imaging unit 15 is mounted in a location having left-right symmetry with the fourth imaging unit 14. That is, the fifth imaging unit 15 is disposed on a front portion on the right side surface of the upper deck 2b. As illustrated in FIG. 4, the fifth imaging unit 15 images a fifth region 15R of the surrounding area of the work vehicle 1 to obtain fifth image data. The fifth region 15R is located diagonally rearward right of the work vehicle 1.

As illustrated in FIG. 3, the sixth imaging unit 16 is attached to the rear portion of the work vehicle 1. Specifically, the sixth imaging unit 16 is disposed above the axle (not shown) connecting the two rear wheels 6 and near a pivoting shaft of the vessel 4. As illustrated in FIG. 4, the sixth imaging unit 16 images a sixth region 16R of the surrounding area of the work vehicle 1 to obtain sixth image data. The sixth region 16R is located rearward of the work vehicle 1.

As illustrated in the center figure in FIG. 4, the abovementioned six imaging units 11 to 16 are able to obtain images of substantially the whole surrounding area of the work vehicle 1. Two adjacent regions among the first to sixth region 16R partially overlap each other as illustrated in the center figure in FIG. 4. Specifically, the first region 11R partially overlaps the second region 12R in a first overlapping region OA1. The first region 11R partially overlaps the third region 13R in a second overlapping region OA2. The second region 12R partially overlaps the fourth region 14R in a third overlapping region OA3. The third region 13R partially overlaps the fifth region 15R in a fourth overlapping region OA4. The fourth region 14R partially overlaps the sixth region 16R in a fifth overlapping region OA5. Moreover, the fifth region 15R partially overlaps the sixth region 16R in a sixth overlapping region OA6. The first to sixth imaging units 11 to 16 transmit the image data showing the imaged images to the controller 19.

The vehicle speed detecting unit 17 detects the vehicle speed of the work vehicle 1. The vehicle speed detecting unit 17 detects the vehicle speed of the work vehicle 1 on the basis of for example, the rotation speed of an output shaft of the transmission. The vehicle speed detecting unit 17 transmits the vehicle speed data that indicates the detected vehicle speed to the controller 19.

The display unit 18 is a monitor disposed inside the cab 3. The display unit 18 is disposed in front of the driver seat inside the cab 3. The display unit 18 displays images in response to controlling by the controller 19.

The controller 19 creates a bird's-eye view image that shows the surrounding area of the work vehicle 1 based on the image data from the imaging units 11 to 16. The controller 19 outputs output signals that represent the created bird's-eye view image to the display unit 18. The display unit 18 displays the bird's-eye view image based on the output signals from the controller 19. As illustrated in FIG. 2, the controller 19 has a traveling state determining unit 21, a storage unit 22, and a bird's-eye view image creating unit 23.

The traveling state determining unit 21 determines the traveling state of the work vehicle 1 on the basis of the vehicle speed data from the vehicle speed detecting unit 17. The traveling state determining unit 21 determines that the work vehicle 1 is in a traveling state when the vehicle speed is equal to or greater than a predetermined threshold. The traveling state determining unit 21 determines that the work vehicle 1 is in a stopped state when the vehicle speed is less than the predetermined threshold. Therefore, in addition to the vehicle speed being zero, a slow traveling state when the vehicle speed is slow is included in the above stopped state.

The storage unit 22 stores various types of information required for the controller 19 to create the bird's-eye view image. Specifically, the storage unit 22 stores first conversion information, second conversion information, and a synthesis ratio to be described below.

The bird's-eye view image creating unit 23 receives the image data from each of the imaging units 11 to 16. The bird's-eye view image creating unit 23 creates the bird's-eye view image of the surrounding area of the work vehicle 1 on the basis of a plurality of images represented by the image data. Specifically, the bird's-eye view image creating unit 23 uses conversion information saved in the storage unit 22 to perform coordinate conversion of the image data. The conversion information is information that indicates an association between location coordinates of pixels of an input image and location coordinates of pixels of an output image. In this case, an input image is an image imaged by the imaging units 11 to 16. Further, the output image is a bird's-eye view image displayed on the display unit 18. The bird's-eye view image creating unit 23 uses the conversion information to convert images imaged by the imaging units 11 to 16 to images seen from a predetermined virtual viewpoint located above the work vehicle 1. Specifically, the images imaged by the imaging units 11 to 16 are converted to images seen from a virtual viewpoint 20 located above the work vehicle 1 due to the images imaged by the imaging units 11 to 16 being projected on a predetermined virtual projection plane 30. The conversion information appears on the virtual projection plane 30. The bird's-eye view image creating unit 23 creates the bird's-eye view image of the surrounding area of the work vehicle 1 by projecting and synthesizing the image data from the plurality of imaging units 11 to 16 on the predetermined virtual projection plane. Specifically, the bird's-eye view image of the surrounding area of the work vehicle 1 is created by projecting and synthesizing the first to sixth image data on the predetermined virtual projection plane.

As described above, regions in the surrounding area of the work vehicle 1 imaged by the imaging units 11 to 16 overlap in the first to sixth overlapping regions OA1 to OA6. The bird's-eye view image creating unit 23 overlaps images of the image data from two of the imaging units 11 to 16 adjacent to each other and displays the overlapping images in the overlapping regions OA1 to OA6. Specifically, the bird's-eye view image creating unit 23 overlaps the image of the first image data from the first imaging unit 11 with the image of the second image data from the second imaging unit 12 and displays the overlapping images in the first overlapping region OA1. The bird's-eye view image creating unit 23 overlaps the image of the first image data from the first imaging unit 11 with the image of the third image data from the third imaging unit 13 and displays the overlapping images in the second overlapping region OA2. The bird's-eye view image creating unit 23 overlaps the image of the second image data from the second imaging unit 12 with the image of the fourth image data from the fourth imaging unit 14 and displays the overlapping images in the third overlapping region OA3. The bird's-eye view image creating unit 23 overlaps the image of the third image data from the third imaging unit 13 with the image of the fifth image data from the fifth imaging unit 15 and displays the overlapping images in the fourth overlapping region OA4. The bird's-eye view image creating unit 23 overlaps the image of the fourth image data from the fourth imaging unit 14 with the image of the sixth image data from the sixth imaging unit 16 and displays the overlapping images in the fifth overlapping region OA5. The bird's-eye view image creating unit 23 overlaps the image of the fifth image data from the fifth imaging unit 15 with the image of the sixth image data from the sixth imaging unit 16 and displays the overlapping images in the sixth overlapping region OA6. Values derived by multiplying the synthesis ratio by image data values are summed up when overlapping and synthesizing two image data sets of the overlapping regions OA1 to OA6 in this way. The synthesis ratio is a value associated with the image data sets and is stored in the storage unit 22. For example, the synthesis ratio of the respective image data is defined such that the synthesis ratio of the first image data is 0.5, the synthesis ratio of the second image data is 0.5, and so on. The plurality of image data sets in the overlapping regions OA1 to OA6 are averaged and displayed by using the synthesis ratios in this way. As a result, a natural bird's-eye view image can be created while suppressing dramatic changes in color or contrast. The bird's-eye view image creating unit 23 creates bird's-eye view image data that represents the bird's-eye view image synthesized as described above, and transmits the bird's-eye view image data to the display unit 18.

Figure 6:
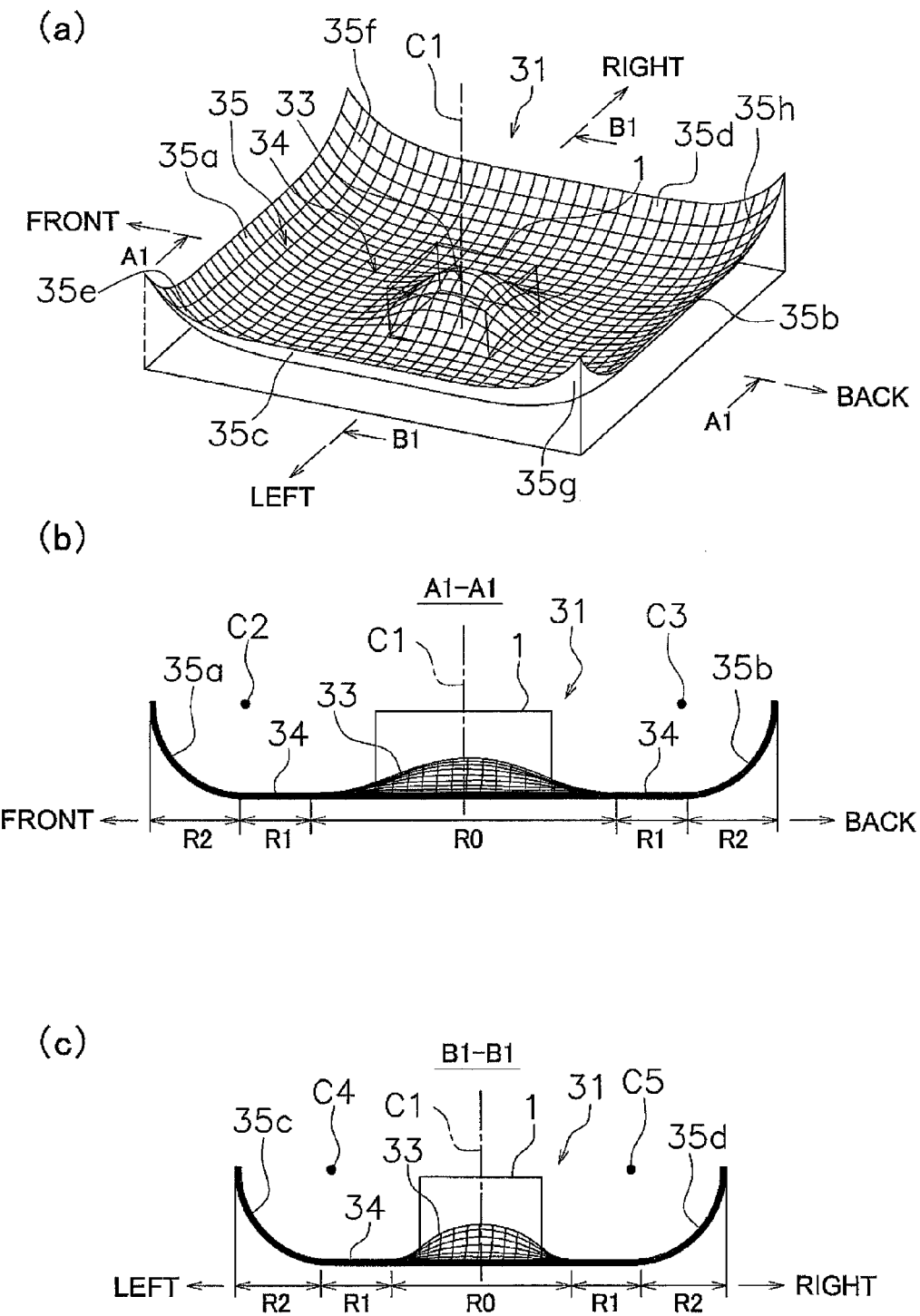
FIG. 6 includes schematic views illustrating an example of a first virtual projection plane.
Figure 7:
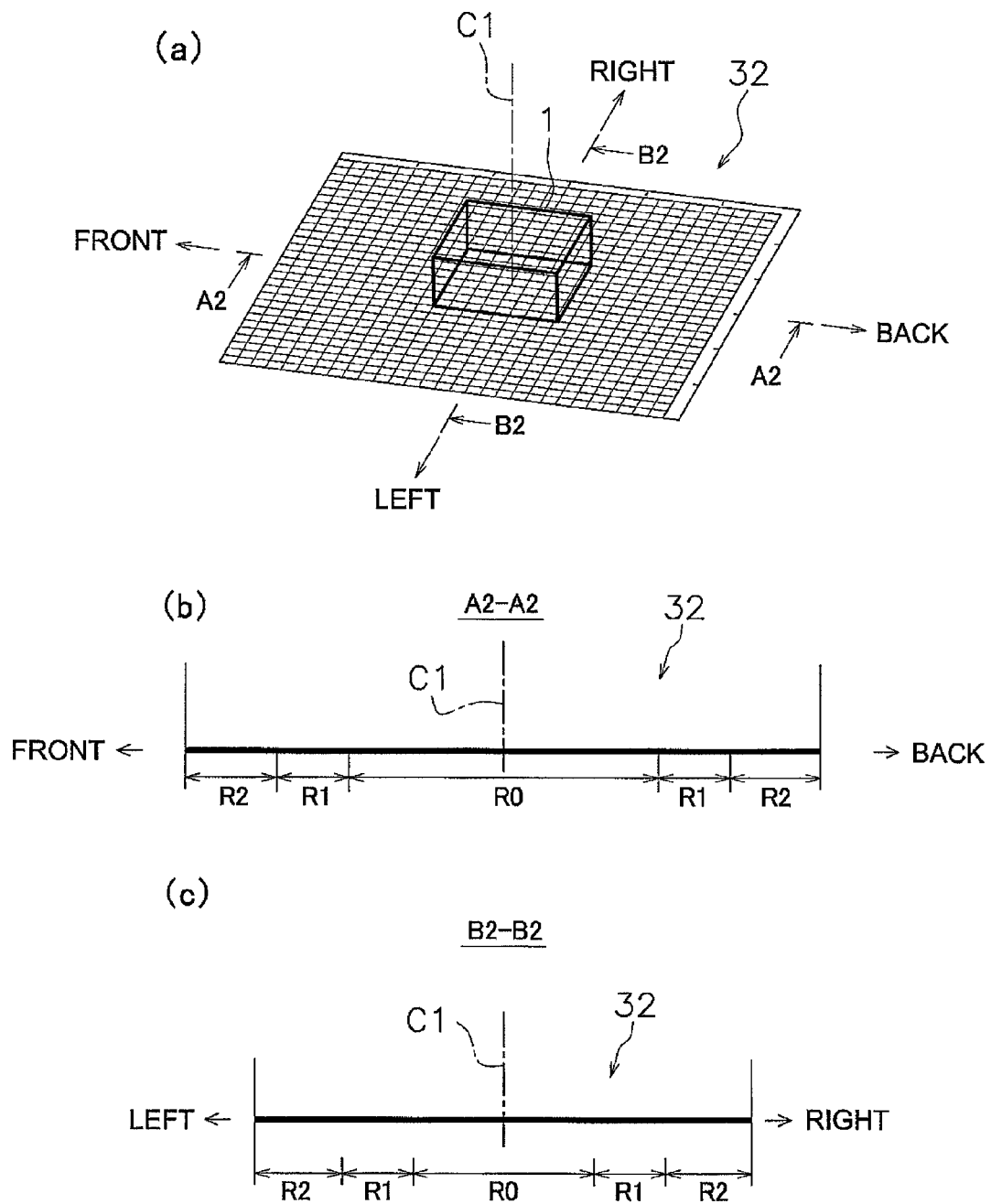
FIG. 7 includes schematic views illustrating an example of a second virtual projection plane.

The bird's-eye view image creating unit 23 selectively uses a plurality of virtual projection planes to create the bird's-eye view image. Specifically, the bird's-eye view image creating unit 23 uses a first virtual projection plane 31 shown in FIG. 6 and a second virtual projection plane 32 shown in FIG. 7 to create the bird's-eye view image. FIG. 6(a) is a perspective view of the first virtual projection plane 31. FIG. 6(b) is a cross-section along lines A1-A1 of the first virtual projection plane 31 in FIG. 6(a). FIG. 6(c) is a cross-section along lines B1-B1 of the first virtual projection plane 31 in FIG. 6(a). FIG. 7(a) is a perspective view of the second virtual projection plane 32. FIG. 7(b) is a cross-section along lines A2-A2 of the second virtual projection plane 32 in FIG. 7(a). FIG. 7(c) is a cross-section along lines B2-B2 of the second virtual projection plane 32 in FIG. 7(a). As described above, the storage unit 22 stores the first conversion information and the second conversion information. The first conversion information is data that shows the first virtual projection plane 31. The second conversion information is data that shows the second virtual projection plane 32. The bird's-eye view image creating unit 23 uses the first conversion information when performing coordinate conversion of the image data to create the bird's-eye view image of the images imaged by the imaging units 11 to 16 projected on the first virtual projection plane 31. The bird's-eye view image creating unit 23 uses the second conversion information when performing coordinate conversion of the image data to create the bird's-eye view image of the images imaged by the imaging units 11 to 16 projected on the second virtual projection plane 32.

Figure 8:
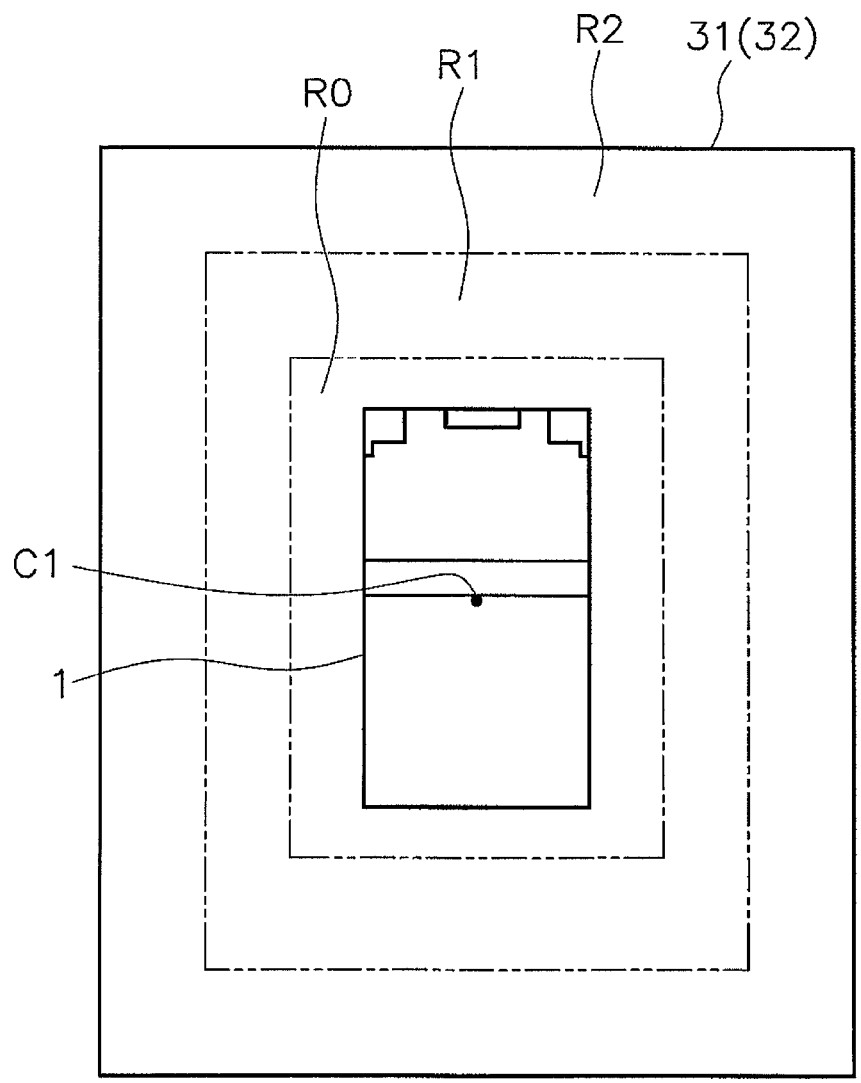
FIG. 8 is a top view illustrating first to vicinal ranges included in the virtual projection plane.

As illustrated in FIG. 6, the first virtual projection plane 31 includes a shape that increases in height from the ground surface in correspondence with proximity to the work vehicle 1 (i.e., the shape that increases in height from the ground surface as the distance from the work vehicle decreases). A center portion of the first virtual projection plane 31 has a shape that increases in height from the ground surface in correspondence with proximity to the work vehicle 1. An outer edge portion of the first virtual projection plane 31 has a shape that increases in height from the ground surface in correspondence with remoteness from the work vehicle 1 (i.e., the shape that increases in height from the ground surface as the distance from the work vehicle increases). As illustrated in FIG. 8, a range in the virtual projection planes 31 and 32 from the center C1 (referred to below as "vehicle center C1") of the work vehicle 1 in the front and back direction and in the vehicle width direction, to positions having a predetermined distance away from the work vehicle 1 to the front, right, left, and back directions is defined as a vicinal range R0. A range adjacent to the vicinal range R0 and located further away from the work vehicle 1 than the vicinal range R0 is defined as a first range R1. A range adjacent to the first range R1 and located further away from the work vehicle 1 than the first range R1 is defined as a second range R2. The second range R2 includes the outer edge portions of the virtual projection planes 31 and 32.

As illustrated in FIG. 6, the first virtual projection plane 31 includes a first varying portion 33, a flat portion 34, and a second varying portion 35. The first varying portion 33 is located in the vicinal range R0 shown in FIG. 8. The height of the first varying portion 33 increases from the ground surface in correspondence with proximity to the vehicle center C1. That is, the height of the first varying portion 33 from the ground surface increases in correspondence with proximity to the work vehicle 1. Therefore, the vicinal range R0 of the first virtual projection plane 31 has a shape in which the height from the ground surface increases in correspondence with proximity to the work vehicle 1. The first varying portion 33 is a shape that inclines upward toward the vehicle center C1. The apex of the first varying portion 33 is located at a position corresponding to the inside of the work vehicle 1. The first varying portion 33 is located below the imaging unit mounted in the lowest location among the plurality of imaging units 11 to 16. The flat portion 34 is located in the first range R1 of the first virtual projection plane 31. The flat portion 34 is continuously joined to the first varying portion 33 in a location further away from the work vehicle 1 than the first varying portion 33. A connecting portion of the first varying portion 33 and the flat portion 34 is located on the ground surface. The height of the flat portion from the ground surface is uniform. Therefore, the first range R1 of the first virtual projection plane 31 is a shape that has a uniformly flat height from the ground surface. Specifically, the flat portion 34 is a flat surface having the same height as the ground surface. Therefore, the first range R1 of the first virtual projection plane 31 has a flat shape that is the same height as the ground surface. The second varying portion 35 is located in the second range R2 of the first virtual projection plane 31. The second varying portion 35 is continuously joined to the flat portion 34 in a location further away from the work vehicle 1 than the flat portion 34. The height from the ground surface of the second varying portion 35 increases in correspondence with remoteness from the work vehicle 1. Therefore, the second range R2 of the first virtual projection plane 31 is a shape that increases in height from the ground surface in correspondence with remoteness from the work vehicle 1. The second varying portion 35 is a shape that inclines upward in a direction away from the work vehicle 1. A connecting portion of the second varying portion 35 and the flat portion 34 is located on the ground surface.

The second range R2, namely the second varying portion 35, of the first virtual projection plane 31 includes a plurality of curved surfaces 35a to 35d, and a plurality of spherical surfaces 35e to 35h. The curved surfaces 35a to 35d are curved around virtual axes parallel to rectangular sides corresponding to the contour of the work vehicle 1. The spherical surfaces 35e to 35h are disposed between respective pairs of adjacent curved surfaces 35a to 35d. The spherical surfaces 35e to 35h are continuously joined to the pairs of adjacent curved surfaces 35a to 35d. Specifically, the second varying portion 35 includes first to fourth curved surfaces 35a to 35d and first to fourth spherical surfaces 35e to 35h. The first curved surface 35a is located in front of the work vehicle 1. The first curved surface 35a curves around a virtual axis C2 as illustrated in FIG. 6(a). The virtual axis C2 is an axis line parallel to the rectangular front surface side corresponding to the contour of the work vehicle 1. The second curved surface 35b is located in the back of the work vehicle 1. The second curved surface 35b curves around a virtual axis C3 as illustrated in FIG. 6(a). The virtual axis C3 is an axis line parallel to the rectangular back surface side corresponding to the contour of the work vehicle 1. The third curved surface 35c is located on the left side of the work vehicle 1. The third curved surface 35c curves around a virtual axis C4 as illustrated in FIG. 6(b). The virtual axis C4 is an axis line parallel to the rectangular left side surface side corresponding to the contour of the work vehicle 1. The fourth curved surface 35d is located on the right side of the work vehicle 1. The fourth curved surface 35d curves around a virtual axis C5 as illustrated in FIG. 6(b). The virtual axis C5 is an axis line parallel to the rectangular right side surface side corresponding to the contour of the work vehicle 1.

The first spherical surface 35e is disposed between the first curved surface 35a and the third curved surface 35c. The first spherical surface 35e is continuously joined to the first curved surface 35a and the third curved surface 35c. The second spherical surface 35f is disposed between the first curved surface 35a and the fourth curved surface 35d. The second spherical surface 35f is continuously joined to the first curved surface 35a and the fourth curved surface 35d. The third spherical surface 35g is disposed between the second curved surface 35b and the third curved surface 35c. The third spherical surface 35g is continuously joined to the second curved surface 35b and the third curved surface 35c. The fourth spherical surface 35h is disposed between the second curved surface 35b and the fourth curved surface 35d. The fourth spherical surface 35h is continuously joined to the second curved surface 35b and the fourth curved surface 35d.

The second virtual projection plane 32 has a flat shape as illustrated in FIG. 7. Specifically, the height from the ground surface of the entire second virtual projection plane 32 including the outer edge portions is uniformly flat. Therefore, the heights from the ground surface of the first range R1, the second range R2, and the vicinal range R0 in the second virtual projection plane 32 are uniformly flat. Specifically, the entire second virtual projection plane 32 has a flat shape located at the same height as the ground surface.

Figure 9:
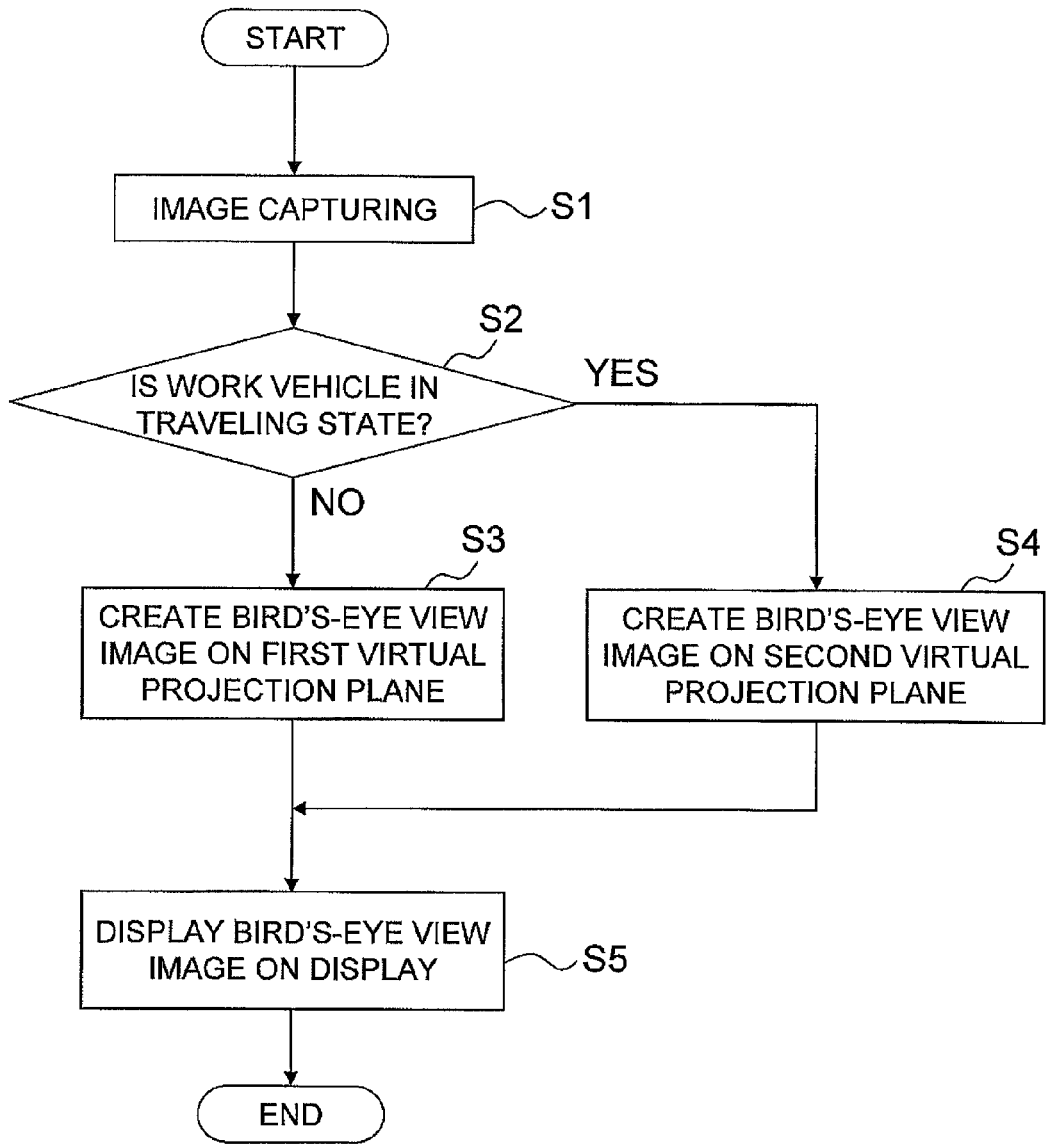
FIG. 9 is a flow chart of a process executed by a controller of the surrounding area monitoring device.

FIG. 9 is a flow chart of a process executed by the controller 19 of the surrounding area monitoring device 1. An explanation of processing for the surrounding area monitoring device 10 to display the bird's-eye view image will be described below with reference to FIG. 9.

First in step S1, the capturing of images is executed. Image data of images imaged by the cameras 11a to 16a of the respective imaging units 11 to 16 is stored in the respective frame memories 11b to 16b of the imaging units 11 to 16.

In step S2, a determination is made as to whether the work vehicle 1 is in a traveling state. The traveling state determining unit 21 determines whether the work vehicle 1 is in the traveling state on the basis of the vehicle speed. As described above, the traveling state determining unit 21 determines that the work vehicle 1 is in the traveling state when the vehicle speed is equal to or greater than the predetermined threshold. Moreover, the traveling state determining unit 21 determines that the work vehicle 1 is in the stopped state when the vehicle speed is less than the predetermined threshold. The routine advances to step S3 when the work vehicle 1 is not in the traveling state. That is, the routine advances to step S3 when the work vehicle 1 is in the stopped state.

Figure 10:
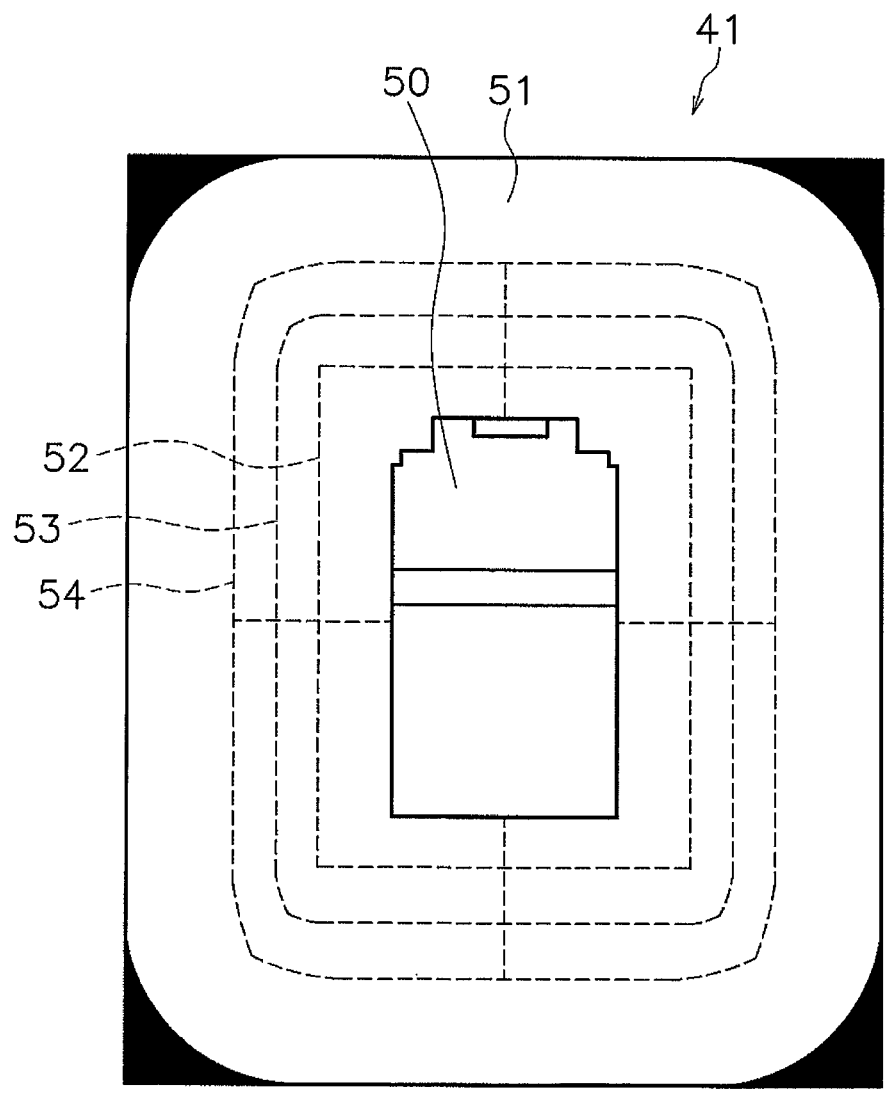
FIG. 10 is a schematic view illustrating an example of a bird's-eye view image in a stopped state.

In step S3, the bird's-eye view image is created using the first virtual projection plane 31. Specifically, the bird's-eye view image creating unit 23 uses the first virtual projection plane 31 shown in FIG. 6 to create the bird's-eye view image. Specifically, the bird's-eye view image creating unit 23 creates the bird's-eye view image by projecting and synthesizing the image data from the imaging units 11 to 16 on the first virtual projection plane 31. FIG. 10 is an example of the created bird's-eye view image (referred to below as a "first bird's-eye view image 41") using the first virtual projection plane 31. The outer frame of the first bird's-eye view image 41 has a rectangular shape. The first bird's-eye view image 41 includes a model figure 50 that shows the work vehicle 1 as a top view, and an image 51 of the surrounding area of the work vehicle 1 as a top view. The first bird's-eye view image 41 includes a plurality of reference lines 52 to 54 that show distances from the work vehicle 1. The reference lines 52 to 54 include a first reference line 52, a second reference line 53, and a third reference line 54. For example, the first reference line 52 represents a location that is 10 m away from the work vehicle 1. The second reference line 53 represents a location that is 15 m away from the work vehicle 1. The third reference line 54 represents a location that is 20 m away from the work vehicle 1. As described above, the second range R2 that includes the outer edge portions of the first virtual projection plane 31 is constituted by the curved surfaces 35a to 35d and the spherical surfaces 35e to 35h. As a result, the image 51 is displayed in a curved manner in the portions nearest to the outer frame of the first bird's-eye view image 41.

Figure 11:
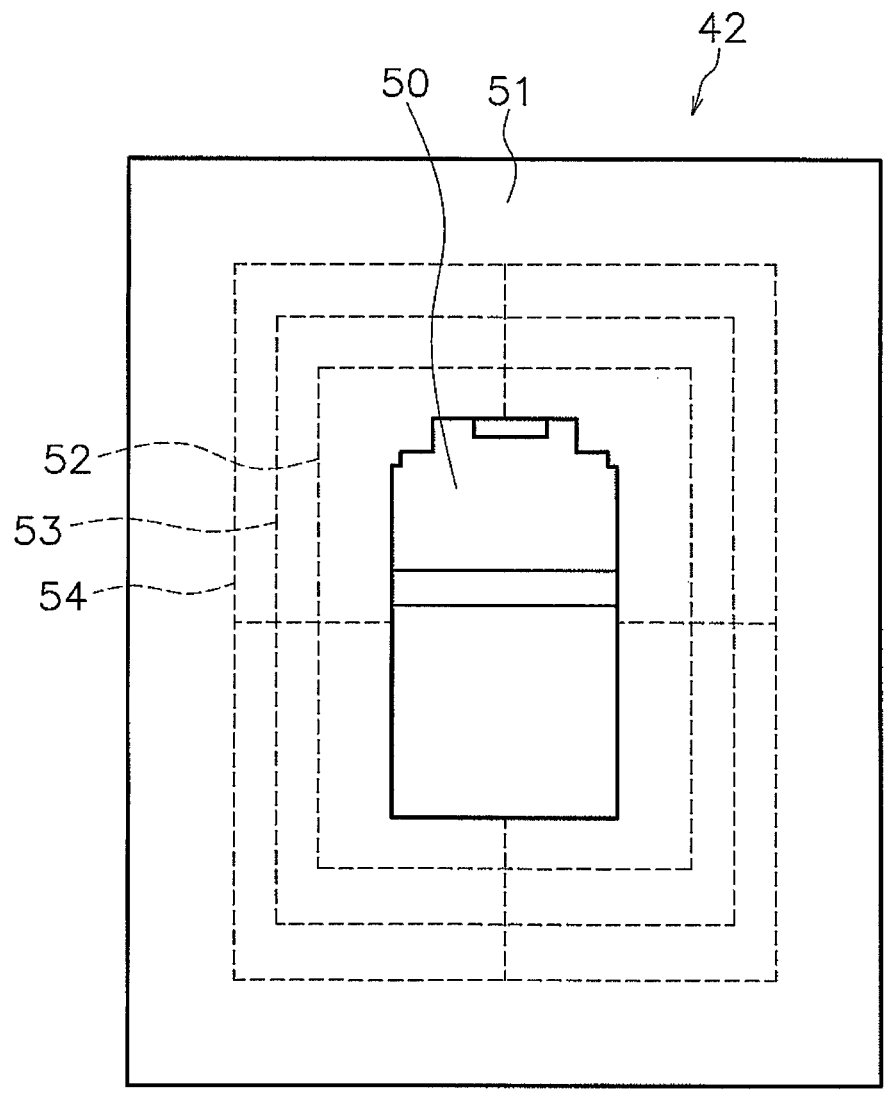
FIG. 11 is a schematic view illustrating an example of a bird's-eye view image in a traveling state.

When the work vehicle 1 is determined to be in the traveling state in step S2, the routine advances to step S4. That is, the routine advances to step S4 when the vehicle speed is equal to or greater than the predetermined threshold. In step S4, the bird's-eye view image is created using the second virtual projection plane 32. FIG. 11 is an example of the created bird's-eye view image (referred to below as a "second bird's-eye view image 42") using the second virtual projection plane 32. The second bird's-eye view image 42 includes the model figure 50 that shows the work vehicle 1 as a top view, and the image 51 of the surrounding area of the work vehicle 1 as a top view similar to the first bird's-eye view image 41. The second bird's-eye view image 42 includes a plurality of reference lines 52 to 54 similar to the first bird's-eye view image 41. As described above, the second virtual projection plane 32 has a flat shape overall. As a result, displaying the image 51 in a curved manner as in the first bird's-eye view image 41 is prevented even in the portions nearest to the outer frame in the second bird's-eye view image 42.

In step S5, the bird's-eye view image is displayed on the display unit 18. In this case, the abovementioned first bird's-eye view image 41 or the second bird's-eye view image 42 is displayed on the display unit 18. Specifically, the first bird's-eye view image 41 is displayed on the display unit 18 when the work vehicle 1 is in the stopped state. The second bird's-eye view image 42 is displayed on the display unit 18 when the work vehicle 1 is in the traveling state.

Next, characteristics of the surrounding area monitoring device 10 in the work vehicle 1 according to the present embodiment will be described.

When the work vehicle 1 is in the stopped state, the bird's-eye view image creating unit 23 creates a bird's-eye view image using the first virtual projection plane 31 in the surrounding area monitoring device 10 of the work vehicle 1 according to the present embodiment. The second varying portion 35 is disposed in the second range R2 that includes the outer edge portion of the first virtual projection plane 31. The height from the ground surface of the second varying portion 35 increases in correspondence with remoteness from the work vehicle 1. Therefore, the phenomenon of the object appearing in an enlarged manner in the first bird's-eye view image 41 when the object is located further away from the work vehicle can be suppressed. As a result, the operator easily understands the shape of the object due to the first bird's-eye view image 41 when the work vehicle 1 is in the stopped state.

When the work vehicle 1 is in the traveling state, the bird's-eye view image creating unit 23 creates a bird's-eye view image using the second virtual projection plane 32. Specifically, the height from the ground surface of the entire second virtual projection plane 32 is uniformly flat. As a result, distortion of the ground surface at the outer edge portions of the second bird's-eye view image 42 is suppressed. Therefore, the distorted appearance of the road in the surrounding area of the work vehicle 1 in the second bird's-eye view image 42 is suppressed. Consequently, the operator can easily recognize where the work vehicle is traveling while the work vehicle is traveling.

The plurality of curved surfaces and the plurality of spherical surfaces are continuously joined in the first virtual projection plane 31. As a result, a smooth first bird's-eye view image 41 with little discomfort for the operator can be created.

The height from the ground surface of the entire second virtual projection plane 32 is uniformly flat. As a result, the second bird's-eye view image 42 with little distortion can be created. Consequently, the operator can easily recognize where the work vehicle 1 is traveling while the work vehicle 1 is traveling.

The traveling state determining unit 21 determines that the work vehicle is in the stopped state when the vehicle speed is less than the predetermined threshold. As a result, the work vehicle is determined to be in the stopped state even if the work vehicle is traveling at a reduced speed. Consequently, the operator can easily understand the size and shape of an object due to the first bird's-eye view image 41 when the work vehicle is traveling at a reduced speed.

Although an embodiment of the present invention has been described so far, the present invention is not limited to the above embodiments and various modifications may be made within the scope of the invention.

Although a dump truck is raised as an example of the work vehicle 1 in the above embodiment, the present invention can be applied to other types of work vehicles such as, for example, a bulldozer or the like.

Figure 12:
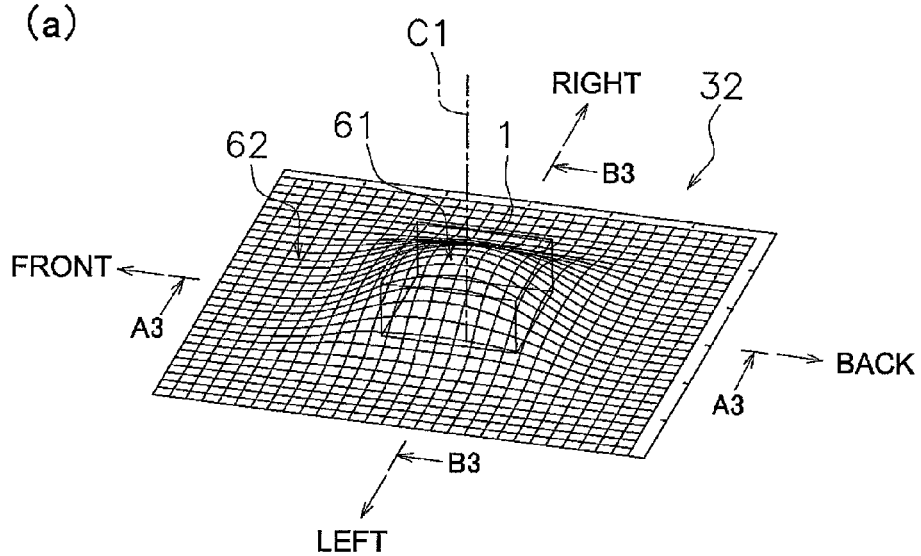
FIG. 12 includes schematic views illustrating an example of a second virtual projection plane according to another embodiment.
Figure 12:
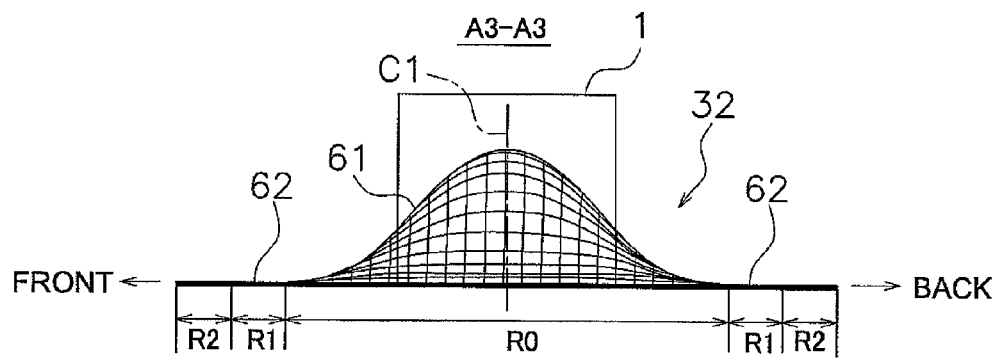
Figure 12:
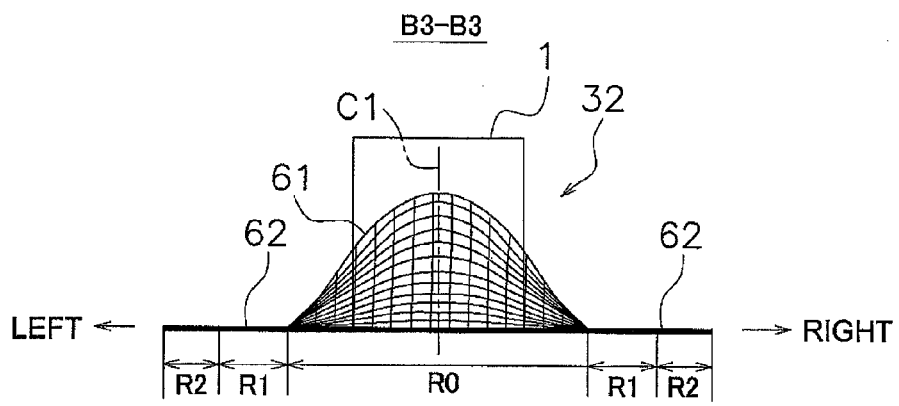

The second virtual projection plane 32 may have a shape in which the height from the ground surface changes in a region other than the second range R2. For example, the second virtual projection plane 32 may be constituted by a varying portion 61 and a flat portion 62 as illustrated in FIG. 12. The varying portion 61 is similar in shape to the first varying portion 33 of the above embodiment. Therefore, the varying portion 61 is a shape that increases in height from the ground surface in correspondence with proximity to the work vehicle 1. The varying portion 61 is located in the vicinal range R0. The flat portion 62 is further away from the work vehicle 1 than the varying portion 61 and extends to the outer frame of the second virtual projection plane 32. Specifically, the flat portion 62 is located in a range that combines the first range R1 and the second range R2. In other words, the first range R1 and the second range R2 of the second virtual projection plane 32 have a height from the ground surface that is uniformly flat.

The number of the imaging units of the present invention is not limited to the six units as described in the above embodiment. Moreover, the dispositions of the imaging units of the present invention are not limited to the dispositions of the imaging units 11 to 16 in the above embodiment. Although the first varying portion 33 in the first virtual projection plane 31 in the above embodiment is an inclined surface in which the height from the ground surface varies continuously, the height of the first varying portion 33 from the ground surface may vary in a stepped manner. Similarly, the height from the ground surface of the second varying portion 35 may also vary in a stepped manner. However, from the point of view of forming a natural bird's-eye view image with little sense of discomfort, the first varying portion 33 preferably is an inclined surface in which the height from the ground surface varies continuously. Similarly, from the point of view of forming a natural bird's-eye view image with little sense of discomfort, the second varying portion 35 preferably is an inclined surface in which the height from the ground surface varies continuously. Moreover, the inclined surface of the first varying portion 33 may be linear or may be curved. Similarly, the inclined surface of the second varying portion 35 may be linear or may be curved. Moreover, the flat portion 34 of the first virtual projection plane 31 is not limited to the same height as the ground surface and may be located at a height that is different from the ground surface.

The work vehicle is determined to be in a traveling state when the vehicle speed is equal to or greater than a certain threshold in the above embodiment. The threshold is not limited to a value larger than zero, and may be zero. Specifically, the work vehicle may be determined to be in the stopped state when the vehicle speed is zero, and the work vehicle may be determined to be in the traveling state when the vehicle speed is larger than zero. Alternatively, the traveling state and the stopped state of the work vehicle may be determined by a parameter other than vehicle speed. For example, the work vehicle may be determined to be in the traveling state when an accelerator operation amount is equal to or greater than a predetermined threshold, and the work vehicle may be determined to be in the stopped state when the accelerator operation amount is less than the predetermined threshold.

The illustrated embodiment is able to provide a surrounding area monitoring device for a work vehicle, the device capable of allowing an operator to easily recognize a location of the work vehicle while the work vehicle is traveling.

What is claimed is:

1. A work vehicle surrounding area monitoring device comprising:
    an imaging unit mounted on a work vehicle, the imaging unit being configured to capture an image of a region of a surrounding area of the work vehicle to obtain image data;
    a bird's-eye view image creating unit configured to create a bird's-eye view image of the surrounding area of the work vehicle by projecting the image data on a virtual projection plane;
    a display unit configured to display the bird's-eye view image; and
    a traveling state determining unit configured to determine whether the work vehicle is in a traveling state or a stopped state,
    wherein,
    the bird's eye view image creating unit selects between creating the bird's eye view image using a first virtual projection plane and creating the bird's eye view image using a second virtual projection plane in response to a determination result of the traveling state determining unit, such that
    when the work vehicle is in the stopped state, the bird's-eye view image creating unit uses the first virtual projection plane to create the bird's-eye view image, at least an outer edge portion of the first virtual projection plane having a shape that increases in height from a ground surface as a distance from the work vehicle increases,
    when the work vehicle is in the traveling state, the bird's-eye view image creating unit uses the second virtual projection plane to create the bird's-eye view image, at least an outer edge portion of the second virtual projection plane having a shape with a uniformly flat height from the ground surface, and
    the display unit switches between displaying the bird's eye view image using the first virtual projection plane and the displaying the bird's eye view image using the second virtual projection plane in response to the determination result of the traveling state determining unit.

2. A work vehicle surrounding area monitoring device comprising:
    an imaging unit mounted on a work vehicle, the imaging unit being configured to capture an image of a region of a surrounding area of the work vehicle to obtain image data;
    a bird's-eye view image creating unit configured to create a bird's-eye view image of the surrounding area of the work vehicle by projecting the image data on a virtual projection plane;
    a display unit configured to display the bird's-eye view image; and
    a traveling state determining unit configured to determine whether the work vehicle is in a traveling state or a stopped state,
    wherein,
    when the work vehicle is in the stopped state, the bird's-eye view image creating unit is configured to use a first virtual projection plane to create the bird's-eye view image, and at least an outer edge portion of the first virtual projection plane has a shape that increases in height from a ground surface as a distance from the work vehicle increases; and
    when the work vehicle is in the traveling state, the bird's-eye view image creating unit is configured to use a second virtual projection plane to create the bird's-eye view image, and at least an outer edge portion of the second virtual projection plane has a shape having a uniformly flat height from the ground surface, the virtual projection plane includes a first range of the surrounding area of the work vehicle and a second range that is further away from the work vehicle than the first range, and the first range of the first virtual projection plane has a shape having a height from the ground surface that is uniformly flat, and the second range of the first virtual projection plane has a shape that increases in height from the ground surface as the distance from the work vehicle increases; and the first range and the second range of the second virtual projection plane have shapes that have a height from the ground surface that is uniformly flat.

3. The work vehicle surrounding area monitoring device according to claim 2, wherein the second range of the first virtual projection plane includes a plurality of curved surfaces that curve around virtual axes that are parallel to rectangular sides corresponding to a contour of the work vehicle, and a plurality of spherical surfaces that are respectively disposed between an adjacent pair of the curved surfaces and are continuously joined to the adjacent pair of the curved surfaces.

4. The work vehicle surrounding area monitoring device according to claim 1, wherein the second virtual projection plane as a whole has a shape having a height from the ground surface that is uniformly flat.

5. The work vehicle surrounding area monitoring device according to claim 1, further comprising a vehicle speed detecting unit configured to detect a vehicle speed of the work vehicle, wherein the traveling state determining unit is configured to determine that the work vehicle is in the traveling state when the vehicle speed is equal to or greater than a predetermined threshold, and to determine that the work vehicle is in the stopped state when the vehicle speed is less than the predetermined threshold.

6. A work vehicle comprising the surrounding area monitoring device according to claim 1.

* * * * *